United States Patent
Okulov

(10) Patent No.: US 9,243,694 B2
(45) Date of Patent: Jan. 26, 2016

(54) CONTINUOUSLY VARIABLE TRANSMISSION

(76) Inventor: Paul D. Okulov, Ste-Anne-de-Bellevue (CA)

(*) Notice: Subject to any disclaimer, the term of this patent is extended or adjusted under 35 U.S.C. 154(b) by 282 days.

(21) Appl. No.: 13/261,435

(22) PCT Filed: Mar. 18, 2011

(86) PCT No.: PCT/CA2011/000286
§ 371 (c)(1),
(2), (4) Date: Sep. 17, 2012

(87) PCT Pub. No.: WO2011/113149
PCT Pub. Date: Sep. 22, 2011

(65) Prior Publication Data
US 2013/0123062 A1    May 16, 2013

Related U.S. Application Data

(60) Provisional application No. 61/315,898, filed on Mar. 19, 2010.

(51) Int. Cl.
*F16H 15/40* (2006.01)
*F16H 15/38* (2006.01)
*F16H 61/664* (2006.01)

(52) U.S. Cl.
CPC .............. *F16H 15/40* (2013.01); *F16H 15/38* (2013.01); *F16H 61/6649* (2013.01)

(58) Field of Classification Search
CPC ......... F16H 15/40; F16H 15/38; F16H 15/28; F16H 15/52; F16H 61/664; F16H 61/6649

USPC ............................ 476/40, 42, 7, 8, 36, 37, 38
See application file for complete search history.

(56) References Cited

U.S. PATENT DOCUMENTS

| | | | |
|---|---|---|---|
| 1,093,922 A | 4/1914 | Dieteeich | |
| 1,775,201 A | 9/1930 | Jacobson | |
| 1,870,421 A | 8/1932 | Prout | |
| 1,904,046 A * | 4/1933 | Hayes | 476/43 |
| 2,097,007 A * | 10/1937 | Weisel | 476/41 |

(Continued)

FOREIGN PATENT DOCUMENTS

| CA | 2311789 | 5/1998 |
|---|---|---|
| WO | 0216803 | 2/2002 |

*Primary Examiner* — David M Fenstermacher

(57) ABSTRACT

A variable transmission arrangement having enhances power output and high efficiency is disclosed. The arrangement provides paired rollers positioned within retaining rotating elements for co-action with, for example, toroidal disks forming full toroidal cavity. The high efficiency is realized by minimizing spin between contracted rollers and toroidal disks. This is achieved by alignment of the rollers so that all corresponding rotational axes and lines tangential to contacting points, namely the input and output rotational axes as well as those of the rollers themselves intersect, thus minimizing spin. This relationship ensures the highest traction and reduced slip necessary for maximizing the output and power density. As many as nine pairs of wedged rollers can be used for overall ratio of 5:1 with ability to provide adequate and proportional clamping while respecting the geometric imperfections of the contacting surfaces. In a simplest configuration paired balls can be used where the balls exhibit self-alignment properties, thus minimizing the spin.

15 Claims, 11 Drawing Sheets

(56) References Cited

U.S. PATENT DOCUMENTS

| | | | |
|---|---|---|---|
| 2,271,688 A | | 2/1942 | Richardson |
| 2,512,717 A | | 6/1950 | Dicke |
| 2,595,367 A | * | 5/1952 | Picanol ............... 476/40 |
| 2,850,911 A | * | 9/1958 | Kraus .................. 476/1 |
| 3,258,981 A | | 7/1966 | General |
| 3,272,025 A | | 9/1966 | Ortwin |
| 3,398,592 A | | 8/1968 | Jaroslav |
| 3,424,018 A | | 1/1969 | Alsch |
| 3,482,461 A | | 12/1969 | Rouverol |
| 4,011,765 A | | 3/1977 | Tippmann |
| 4,112,779 A | * | 9/1978 | Kemper et al. ........ 475/115 |
| 4,224,840 A | | 9/1980 | Kraus |
| 4,424,919 A | | 1/1984 | Knox et al. |
| 4,572,016 A | * | 2/1986 | Okoshi ................ 476/40 |
| 5,214,973 A | * | 6/1993 | Hambric .............. 476/69 |
| 5,464,086 A | | 11/1995 | Coelln |
| 5,697,863 A | | 12/1997 | Dawe et al. |
| 5,971,886 A | * | 10/1999 | Yamamoto .......... 476/10 |
| 6,117,042 A | * | 9/2000 | Wafzig ................ 476/40 |
| 6,482,121 B2 | | 11/2002 | Okoshi |
| 6,849,025 B2 | | 2/2005 | Chikaraishi et al. |
| 8,827,864 B2 | * | 9/2014 | Durack ................ 476/42 |

* cited by examiner

View A

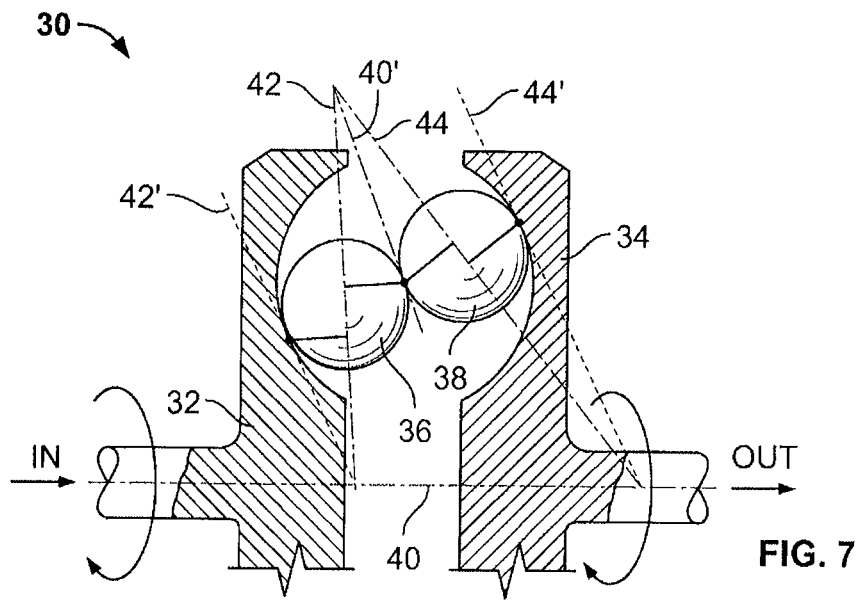
FIG. 7
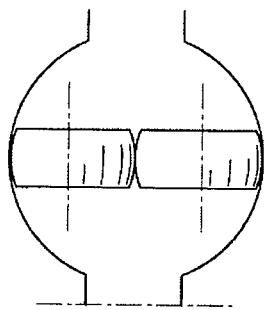
FIG. 8
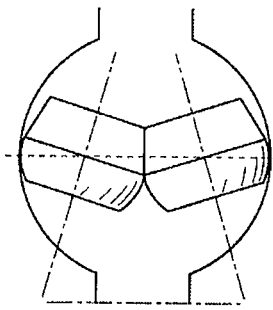
FIG. 9
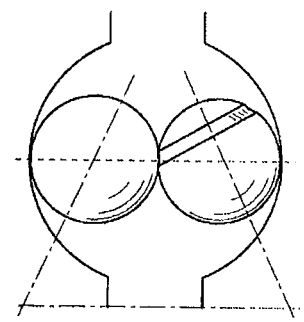
FIG. 10
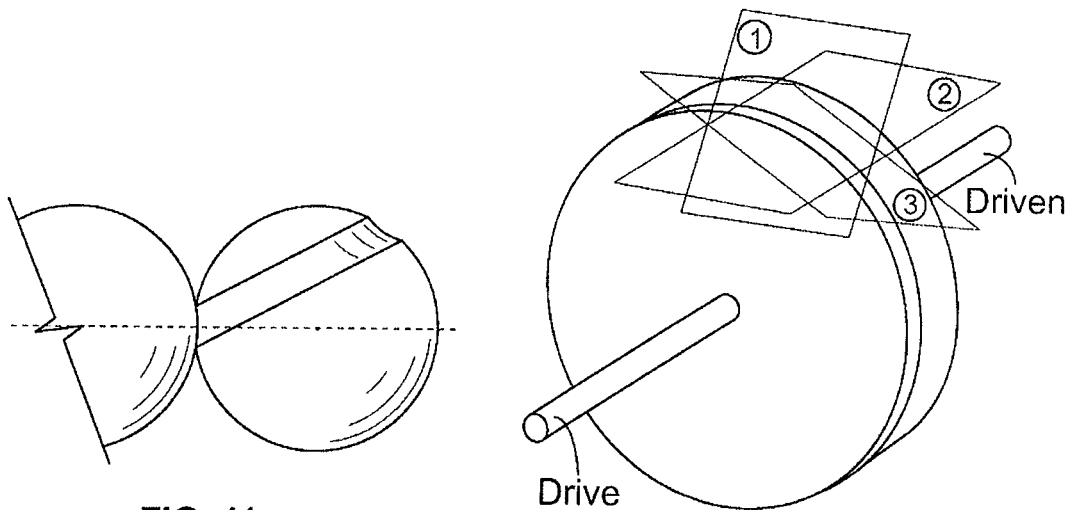
FIG. 11
FIG. 12

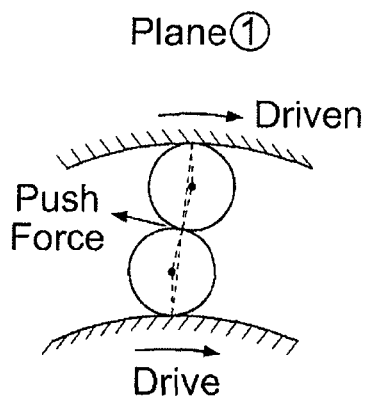
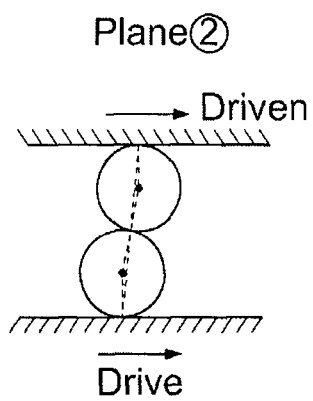
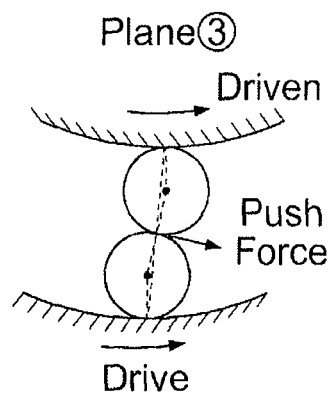
FIG. 13  FIG. 14  FIG. 15
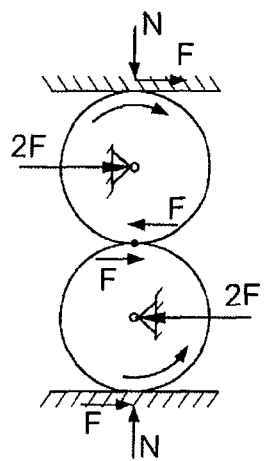
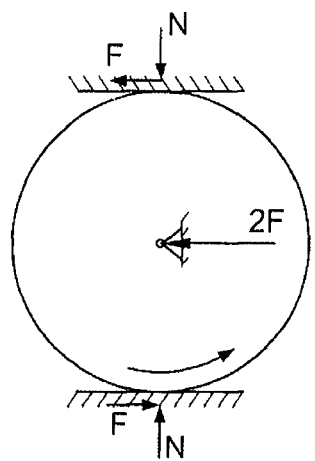
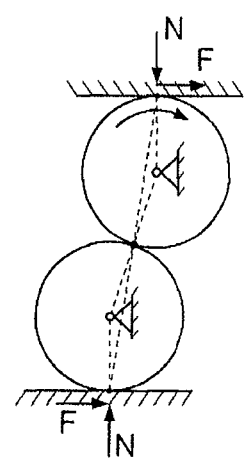
FIG. 16  FIG. 17  FIG. 18

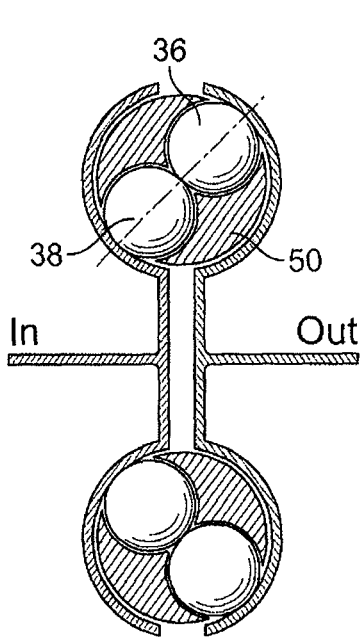
FIG. 19
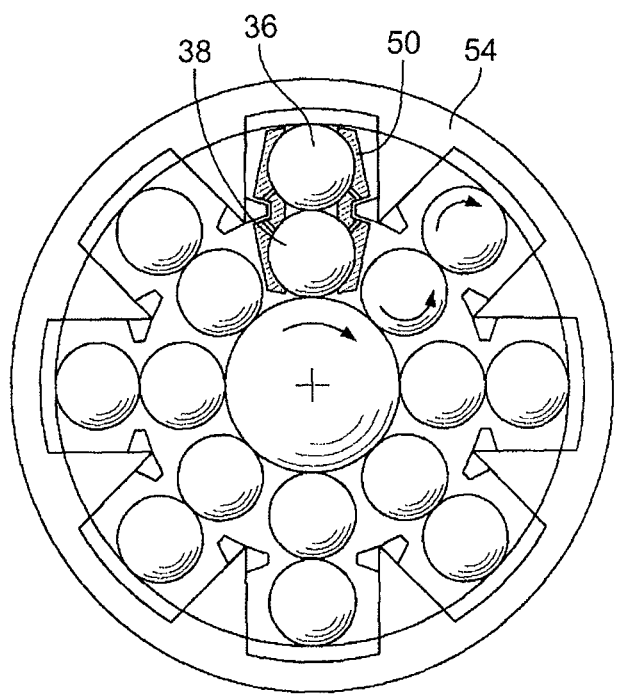
FIG. 20
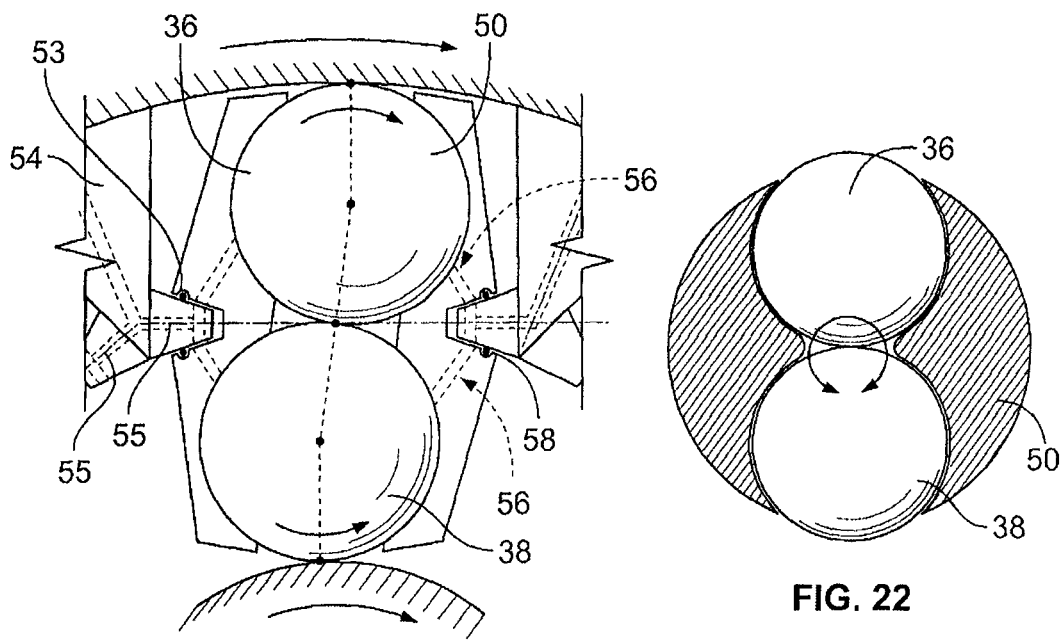
FIG. 21
FIG. 22

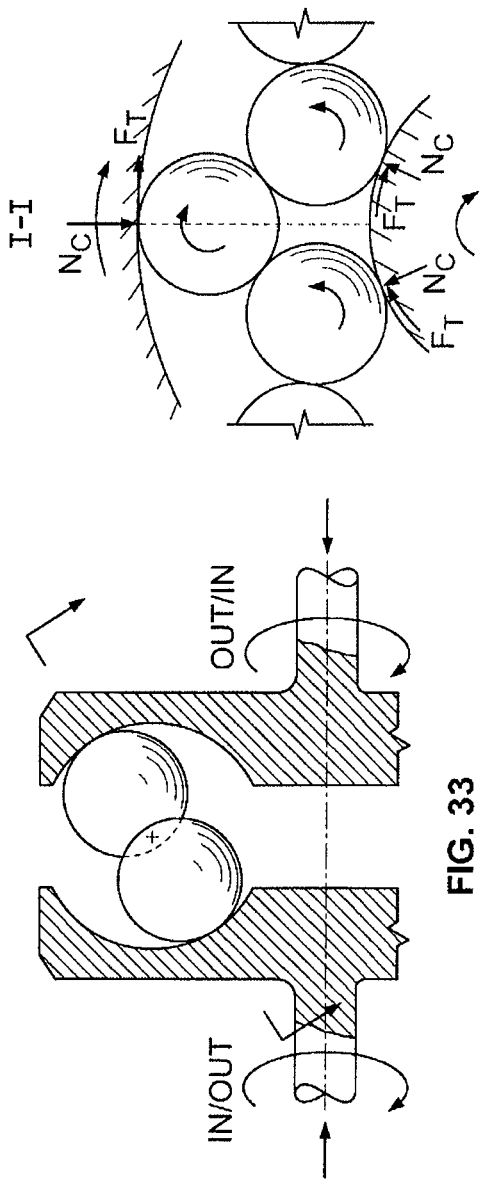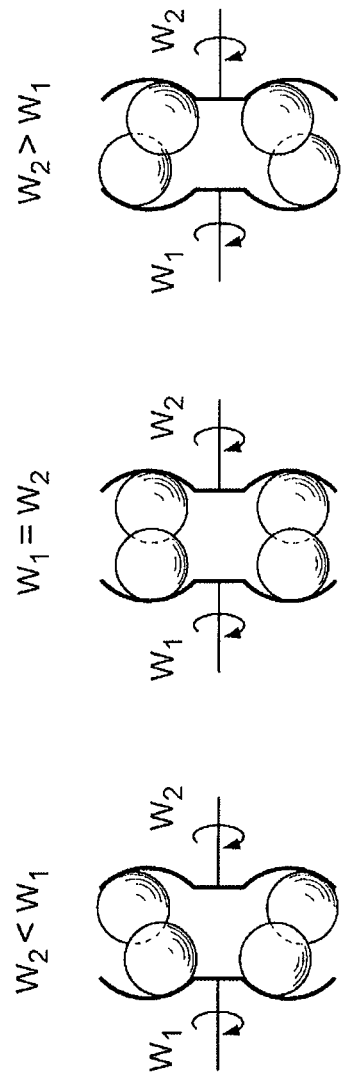

CONTINUOUSLY VARIABLE TRANSMISSION

TECHNICAL FIELD

The present invention relates to a continuously variable transmission, more particularly, the present invention relates to improvements in full cavity toroidal transmissions for enhanced operating efficiency, power density and scaleability.

BACKGROUND ART

It has been well established in the art that variable speed and continuously variable transmissions have significant utility and for this reason, the prior art is replete with a great number of innovations in this area wherein even most modern designs are still based on generic devices and configurations devised many decades ago.

Current limitations of use of such devices is generally linked with relatively low power density and efficiency compared with conventional multi-speed gear boxes.

Advantageously a frictional gear continuously variable transmission can offer low noise, smooth operation and speed transition and the possibility of being utilized for a vast scope of applications ranging from micro or nano-mechanical devices where saving of microwatts of power can significantly prolong its autonomous life and to variable speed power generation or power transfer in amounts measured in megawatts.

Many existing systems share a common limitation of their designs where neglecting the negative effect of spin at the contract points of rotating bodies drastically reduces available traction leading to unnecessary elevated slip of traction surface relative to each other and finally leading to waste of available energy converted into heat. Elevated heat in turn requires higher circulation of lubrication fluid, larger heat exchangers and pumps, causing therefore increased complexity and cost for such systems and reducing the overall efficiency even further.

At the same time, many existing devices also fail to ensure a simple "up" and "down" scalability, generally due to the complexity of their controlling, clamping and speed variation systems.

Another common disadvantage of existing toroidal systems is that input and output shafts rotational directions differ, which in many instances complicates retrofit installations in continuously variable transmissions for existing motor vehicles and electric generators.

Turning to prior art and, as an example, Forster et al., in U.S. Pat. No. 2,271,688, issued Feb. 3, 1942, discloses a variable speed friction drive. The innovation in the document relates to the novel spring biased ball assembly which is used as a transmitting medium between a drive member and a driven member. The ball assembly provides the balls in contacting relation along the line forming an acute angle with respect to a line perpendicular to the surface of the disc-shaped driving member. A spring is provided which biases one race containing the balls with respect to the other so as to tend to decrease the angle and thus maintain continuous driving engagement between the driving member, balls and driven member. This provided a significant improvement in the variable speed friction drive arrangements.

In U.S. Pat. No. 1,093,922, issued Apr. 21, 1914 to Dieterich, there is disclosed a power transmission apparatus. The transmission apparatus converts high speed power to low speed power and vice versa and broadly provides the combination of a driving member, a driven member together with a plurality of sets of co-acting rollers for transmitting motion from one to the other. The sets of rollers are adapted to transmit power interposed between coaxial or eccentrically disposed member relative to a shaft of the device.

Jacobsen, in U.S. Pat. No. 1,775,201, issued Sep. 9, 1930, provides for a change of speed friction drive. In this arrangement, the patentee provided a novel arrangement for a change of speed friction drive power transmission which combined an angular raceway, a second angular raceway rolling friction members interposed between the raceways having variable contract therewith and means of forming an axis, to and for supporting the raceway's concentrically and substantially in the same plane and for relative rotation about the axis and including an input shaft held against axial displacement. The shaft is rotatable about the axis and connected to and for rotating these second mentioned raceway to communicate power to the mechanism. The combination further included an output shaft which was held against any axial displacement and which was rotatable about the axis connected to the first angular raceway and rotated thereby.

U.S. Pat. No. 1,870,421, issued Aug. 9, 1932, to Prout provides for a system of friction gearing. In the Patent, the patentee teaches a simple mechanism for transmitting power which is capable of operating quietly and smoothly at a high rate of speed without any possibility of a slippage when presented with a heavy load. In the arrangement, the system provides a drive shaft, a driven shaft parallel thereto, friction wheels having beveled friction surfaces with the friction wheels on the drive shaft comprising different diameters than friction wheels on the driven shaft and intermediate friction wheels having beveled surfaces of different diameters and face angles for engaging friction wheels on the driving and driven shafts. In the embodiment shown, the intermediate friction wheels are mounted for floatable movement above and between the driving and driven friction wheels and driveable in a direction to be drawn into closer contact with the wheels by the tangential forces being transmitted.

In U.S. Pat. No. 2,512,717, issued to Dicke, Jun. 27, 1950, there is disclosed power transmission. The focal point of the invention related to power transmissions and particularly to transmissions having infinitely variable drive ratios. The invention comprises a driving friction element and a driven friction element, each of these being frictionally engaged to a rolling member such as a ball and compressed therebetween.

General, in U.S. Pat. No. 3,258,981, issued Jul. 5, 1966, provides a variation on the infinitely variable speed friction drive. In the document, there is a discussion concerning circumferentially spaced rolling friction elements, an example of which is given a steel balls which are used to frictionally transmit a drive between a power input and output race members. In greater detail, the arrangement provided hydrodynamic ball reaction members for the transmission. The reaction ball was supported in a courier having a mating conforming seat supplied with a fluid under pressure to lubricate the ball, but also to provide flotation and reduce frictional losses.

In U.S. Pat. No. 3,272,025, issued Sep. 13, 1966, to Stieber, there is disclosed an infinitely variable speed power transmission which is particularly directed to a ball friction transmission. In the document, power transmission between an input and an output shaft is provided by one ball, which is indicated to be displaceable between two conical surface discs at the end of the two shafts. The same is clamped therebetween by a force, the magnitude of which is variable in conformity with the torque derived therefrom.

Further developments in transmissions were promulgated by Brany. The document is U.S. Pat. No. 3,398,592, issued on Aug. 27, 1968, for an arrangement for the control of the movement of balls.

In U.S. Pat. No. 6,482,121, issued Nov. 19, 2002, to Okoshi, there is disclosed a drive arrangement which clamps an output disc such as a tire with two driving rollers so as to drive the output disc. The drive arrangement is compact, lightweight, low-noise and inexpensive and can be used for a bicycle equipped with an electrical assist drive or various kinds of welfare-specific vehicles. The drive apparatus includes an input shaft and two output shafts extending in a single plane in parallel to each other. The input shaft has an input roller and each of the output shafts has an output roller. A loading roller is located between the input roller and one of the output rollers and an axis of the loading roller is slightly spaced from the plane of the two out shafts. An outer peripheral surface of each roller is a substantially cylindrical rolling surface. The loading roller is preloaded by a preload spring such that it squeezes between the input roller and one of the output rollers. A friction force generated on the rolling surface by a torque exerted on the input roller pushes in the loading roller between the rolling surfaces of the input roller and one of the output rollers so that a large normal force is produced between the rolling surfaces. A friction force at the rolling surface transmits the torque of the input shaft to the two output shafts.

In U.S. Pat. No. 5,697,863, issued Dec. 16, 1997, to Daniel J. Dawe and Charles E. Kraus, there is provided an indefinitely variable traction roller transmission, wherein two toric traction disks are rotatably supported opposite one another and define a torte cavity in which at least two motion transmitting traction rollers are disposed in engagement with the two toric disks and supported by trunnions, the trunnions being pivotally supported to permit changing the ratio of motion transmission between the toric disks. The toric disks each have a different cavity radius, thus causing the circles of contract of the traction rollers with the toric disk to change as the trunnions pivot to various transmission ratio positions, thereby distributing the loads on the traction rollers over a relatively large surface area thus extending the fatigue life of the traction rollers and consequently of the transmission.

In U.S. Pat. No. 5,464,086, issued Nov. 7, 1995, to Axel Coelin, a ball deck is disclosed capable of conveying a container having an uneven button surface. The ball deck, having an upper surface, houses a plurality of ball transfer units. Each ball transfer unit has a first housing having an upper end terminating adjacent the upper surface of the ball deck. A first load supporting ball, which is preferably hollow, is disposed in an upper section of the housing and has a portion extending above the upper surface of the ball deck. A second load supporting ball, having a lesser diameter than the first ball, supports the first ball. A spring biases the balls axially upward by allowing the first ball to move between an upward position and a downward position when supporting an irregular load surface.

In U.S. Pat. No. 4,424,919, issued Jan. 6, 1981, to Ulrich Menzi, there is provided a variable speed transmission of the friction-drive type comprising a driving shaft having at least two ball-driving elements, the driving shaft having drive means associated therewith for rotation of the ball-driving elements. A first torque transmitting means connected with the driving shaft and associated with the ball driving elements rotating the latter in unison with the drive shaft. A first ball means comprising first cage means and at least two balls each of which balls is in rolling contact with the ball-driving element. A drive-shaft provided compromises at least three driven shafts disposed parallel to one another. A second ball means comprises second cage means and at least two balls, each of which balls is in rolling contact with two of the three driven shafts. A gap between the two adjacent ones of the three driven shafts is smaller than the diameter of the respective ball being in contact with these two adjacent drive shafts.

In U.S. Pat. No. 4,224,840, issued Sep. 30, 1980, to Charles E. Kraus, a traction roller transmission is disclosed. The transmission includes coaxial input and output shafts with a sun roller associated with one and a traction ring surrounding the sun roller associated with the other shaft and traction transmitting roller casters disposed in the annular space between and in engagement with the sun roller and the traction ring for the transmission of motion therebetween. Each roller caster includes two transmission rollers whose combined diameters are slightly larger than the gap between the sun roller and the traction ring, one of the transmission rollers being in engagement with the sun roller and the other with the traction ring such that a torque transmitted through the transmission tends to pivot the casters, which are slightly tilted, into a more upright position with respect to the sun roller and traction ring surfaces, thereby forcing the transmission rollers into firm engagement with each other and with the traction ring and the sun roller. The casters have a pivotal support disposed in front of them, with respect to their direction of movement relative to the traction ring and sun roller which both rotate in the same direction, so that the casters swing into perfect parallel alignment with the axis of the sun roller and the traction ring.

In U.S. Pat. No. 6,849,025, issued Feb. 1, 2005, to Kazuo Chikraishi, Atsushhi Maeda and Manabu Abe, a frictional roller transmission is provided. The arrangement comprises a first roller and a second roller disposed around two shafts which are separated from each other in such a manner that the two rollers are not brought into contact, a third roller and a fourth roller which are brought into contact with both the first and second rollers and are disposed between the first roller and the second roller and on an opposite side over a line connecting the center of the first roller and that of the second roller. An angle made by a tangential line between the first roller and the third roller (or the fourth roller) and a tangential line between the second roller and the third roller (or the fourth roller) is set at two times as large an angle of friction obtained from a coefficient of friction between the respective rollers or smaller.

In U.S. Pat. No. 4,011,765, issued Mar. 15, 1977, to Heinrich Tippman, there is disclosed a ball and cone type variable ratio mechanical transmission in which the cone angles are chosen to provide optimum efficiency, increased power handling capability and extended service life.

In U.S. Pat. No. 3,482,461, issued Dec. 9, 1969, to William S. Rouverol, a transmission of the type wherein power is transmitted between a pair of opposed disks by a roller interposed between the disks and mounted on an axis of rotation slantingly disposed relative to the disks. The traction force between the roller and the disks is established by resiliently clamping the roller between the disks.

In U.S. Pat. No. 3,424,018, issued Jan. 28, 1969, to Richard E. Alsch, there is provided a variable transmission having symmetrical discs each with oppositely facing planar faces and held in engagement with transmission balls by face-to-face engagement with input and output members. A holding force is exerted on the drive elements in a pure axial sense and axial thrust bearings provide the medium through which that force is applied with the biasing spring directly engaging the thrust bearing. Friction material provides the drive connection to the input disc and the drive member for the input disc extends through a clearance opening in the housing for connection to an external drive. The ball assembly is supported for pivotal movement about a horizontal axis and the balls provide both the medium of transmission between the discs and the bearing between the cage and its saddle. The bearing surfaces of the ball assembly are coated with a material having a low coefficient of friction.

The entire disclosures of all references recited above are incorporated hereon by reference.

DESCRIPTION OF THE INVENTION

One object of one embodiment of the present invention is to provide a continuously variable transmission containing an input member and an output member and a toroidal shape cavity; said transmission, comprising: a plurality of discrete roller pairs arranged in contact in between said input member and said output member, each roller of said roller pairs in contacting relation with a corresponding roller in a pair and aligning its rotational axis in a plane substantially parallel to a plane of rotation of said input member and said output member and each pair of said rollers of said roller pairs together has rotational freedom in said plane.

A further object of one embodiment of the present invention is to provide a method of increasing the output efficiency of a continuously variable transmission, comprising:

providing an input member having a rotational axis;
providing an output member having a rotational axis;
providing a plurality of discrete roller pairs arranged in contact in between said input member and said output member, each roller of said roller pairs in contacting relation with a corresponding roller with freedom (or an ability to self-align) of alignment of its rotational axis in the plane substantially parallel to a plane of rotation of said input member (fitting for change of ratio) and said output member and each pair of said rollers of said roller pairs together has rotational freedom in said plane; and
positioning said discrete roller pairs such that the rotational axis of each roller in said roller pairs and lines tangential at points of contact of said rollers with input and output members intersect at a point with said rotational axis of said input member and said output member, whereby spin between rollers in said roller pairs and input and output members is eliminated to provide maximized efficiency and power output.

A still further object of one embodiment of the present invention is to provide a continuously variable transmission containing an input member and an output member and a toroidal shape cavity; said transmission, comprising:

a plurality of discrete roller pairs arranged in contact in between said input member and said output member, each roller of said roller pairs in contacting relation with a corresponding roller in a pair and self-aligning in its rotational axis in a plane substantially parallel to a plane of rotation of said input member and said output member and each pair of said rollers of said roller pairs together has rotational freedom in said plane; and
retaining means for retaining discrete roller pairs; and
lubrication means for introducing lubricant into said roller pairs.

Yet another object of one embodiment of the present invention is to provide a continuously variable transmission containing an input member and an output member and a toroidal shape cavity; said transmission, comprising a plurality of discrete roller pairs arranged in contact in between said input member and said output member, each roller of said roller pairs in contacting relation with a corresponding roller in a pair and aligning in its rotational axis in a plane substantially parallel to a plane of rotation of said input member and said output member and each pair of said rollers of said roller pairs together has rotational freedom in said plane; and
retaining means for retaining discrete roller pairs; and lubrication means for introducing lubricant into said roller pairs; and
a housing surrounding said roller pairs and said toroidal cavity.

Having thus generally described the invention, reference will now be made to the accompanying drawings illustrating preferred embodiments.

BRIEF DESCRIPTION OF THE DRAWINGS

FIG. 7 is a schematic illustration of the principle of alignment of rotational exes of balls (rollers) and input and output members arranged to form a toroidal cavity and providing near zero spin effect FIG. 8 represents an arrangement of two common rollers in a toroidal cavity;

FIG. 9 illustrates two rollers with alternate surfaces for contacting the input and output members and each other.

FIG. 10 illustrates two balls where one ball has a groove with radius negative to the radius of the paired ball in order to provide higher clamping capacity and reduce the level of Hertzian stress between balls;

FIG. 11 illustrates the groove or race per FIG. 10 in greater detail;

FIG. 12 illustrates the planes or rollers in contacting surfaces for the clarity of further illustrations (FIGS. 13 through 15);

FIG. 13 illustrates the alignment of a roller's pair for transmitting power from lesser radius of toroidal cavity to greater radius (under-drive or reduction of speed). The balls are in plane 1 defined in FIG. 12;

FIG. 14 illustrates the alignment of a roller's pair for transmitting power from equal radii of toroidal cavity (one-to-one ratio). The balls are in plane 2 defined in FIG. 12;

FIG. 15 shows the alignment of a roller's pair for transmitting power from greater radius or toroidal cavity to smaller radius (over drive or increase of speed). The balls are in the plane 3 defined in FIG. 12;

FIG. 16 illustrates the reaction force on rollers or balls supports where the contacting points are aligned in a straight line substantially perpendicular to the surfaces of the input and output members;

FIG. 17 illustrates a single roller configuration from the prior art with reaction force twice that of traction force;

FIG. 18 schematically illustrates a phenomenon of providing traction and clamping forces with near "zero" reaction force on rollers or balls where the line connecting rollers' contact points is provided in inclined configuration relative to the normal to surfaces of input and output members at the contacting points;

Figure 1:
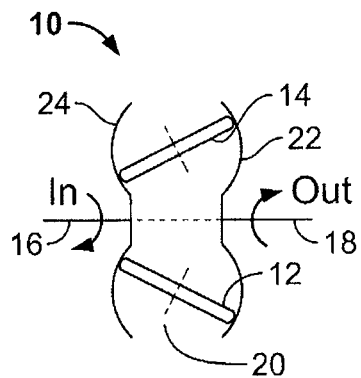
FIG. 1 is a schematic illustration of a full toroidal continuously variable transmission.
Figure 23:
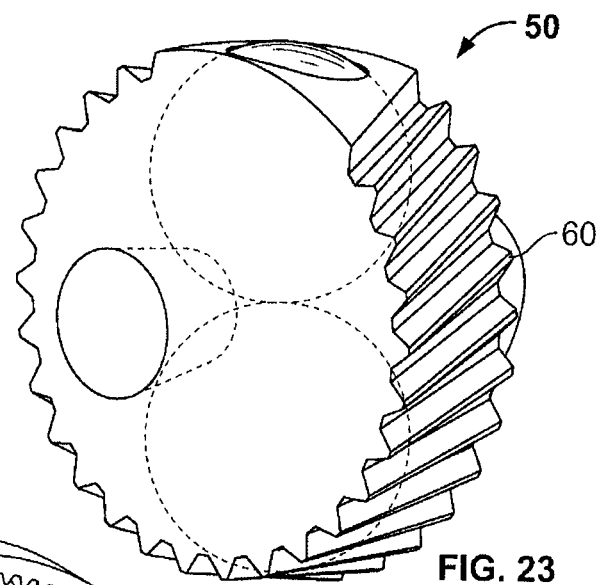
Figure 24:
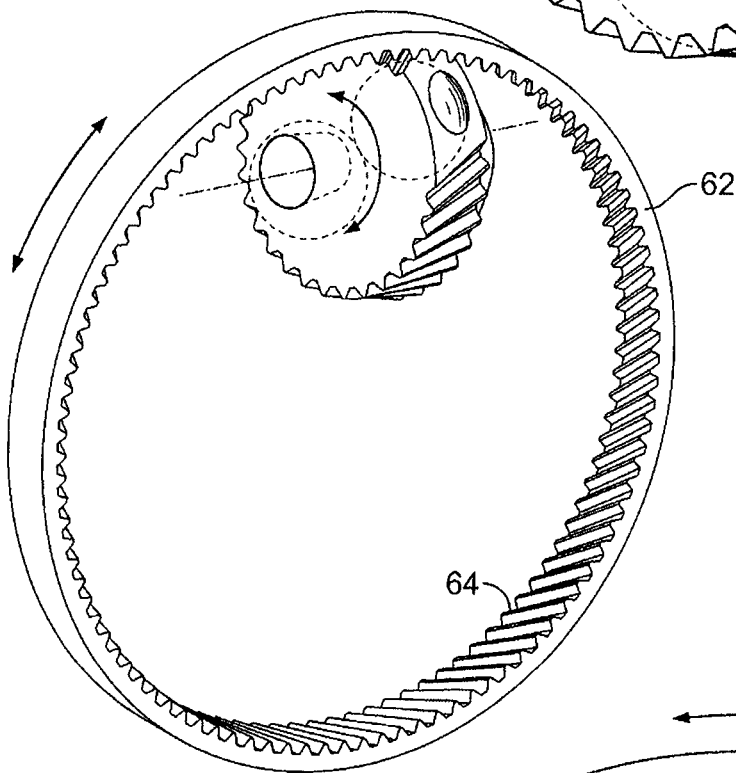
Figure 25:
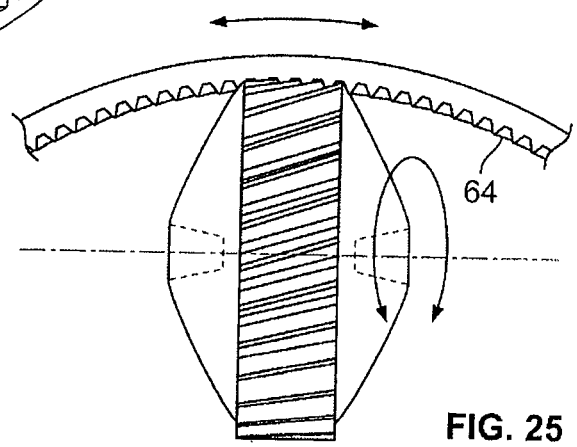
Figure 26:
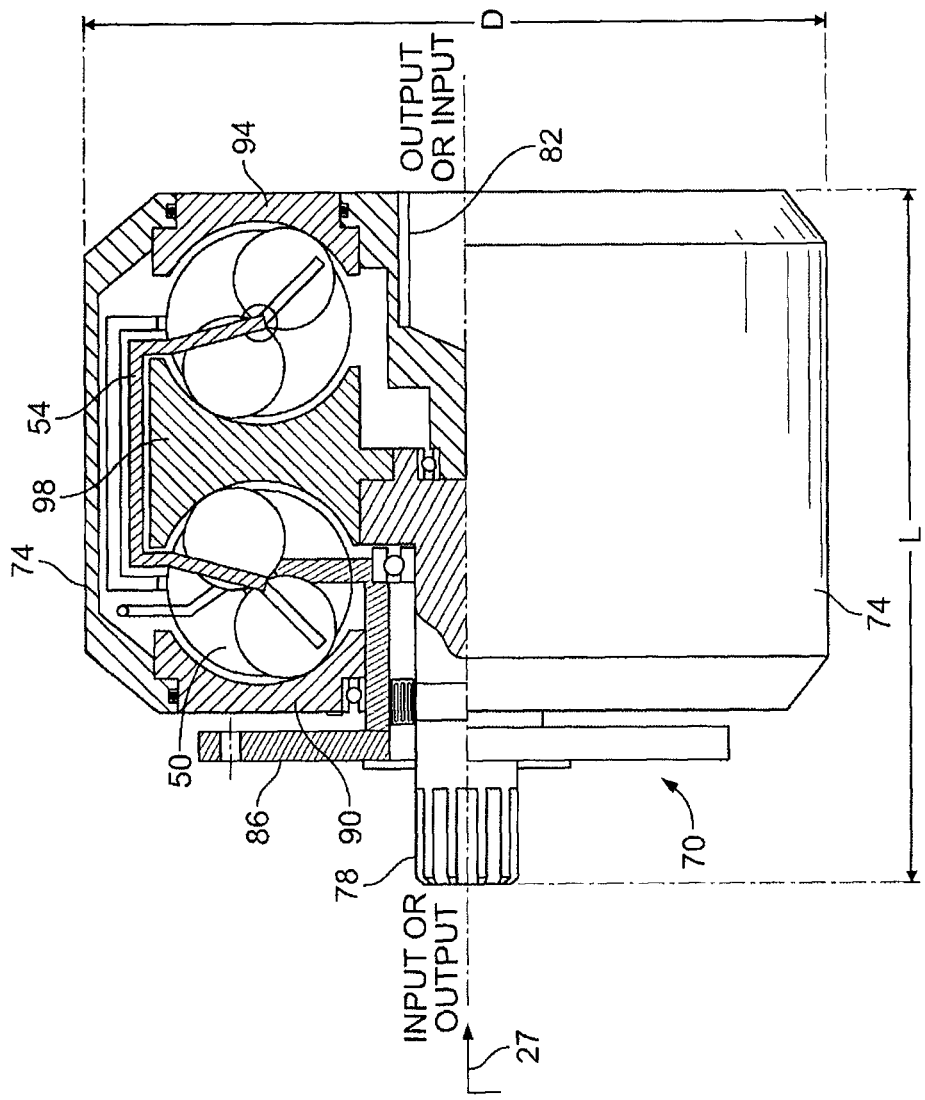
Figure 27:
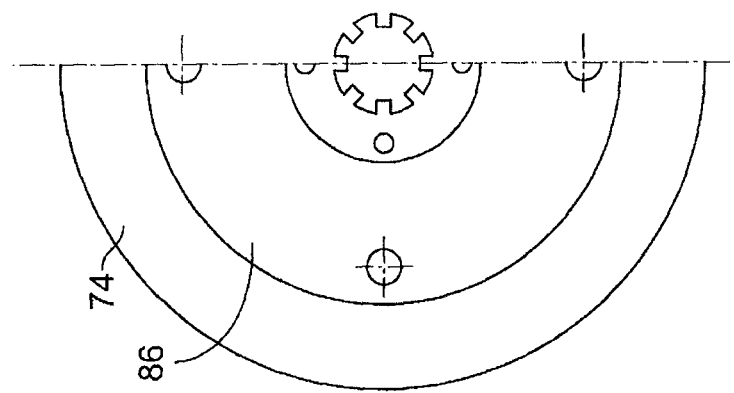
Figure 28:
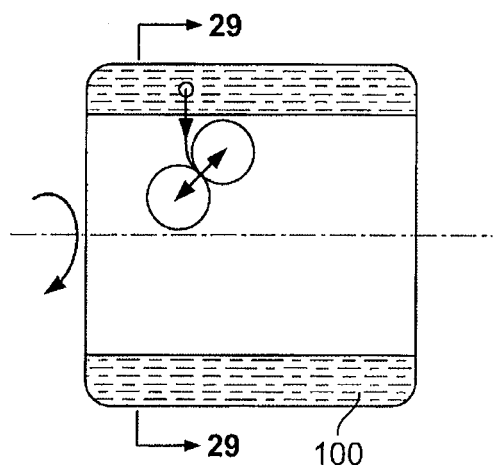
Figure 29:
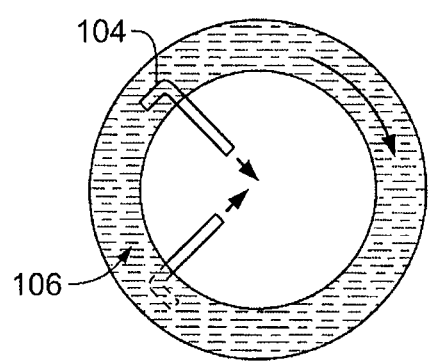
Figure 30:
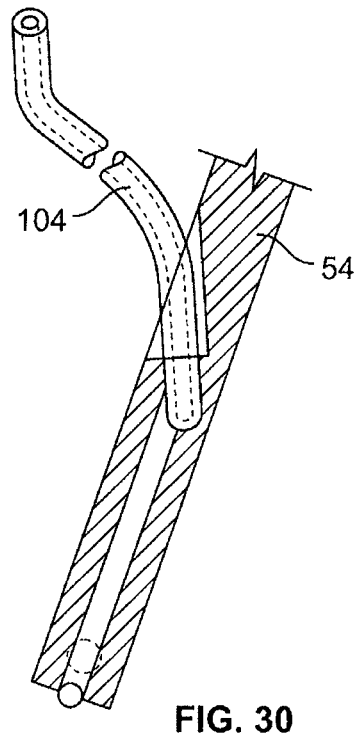
Figure 31:
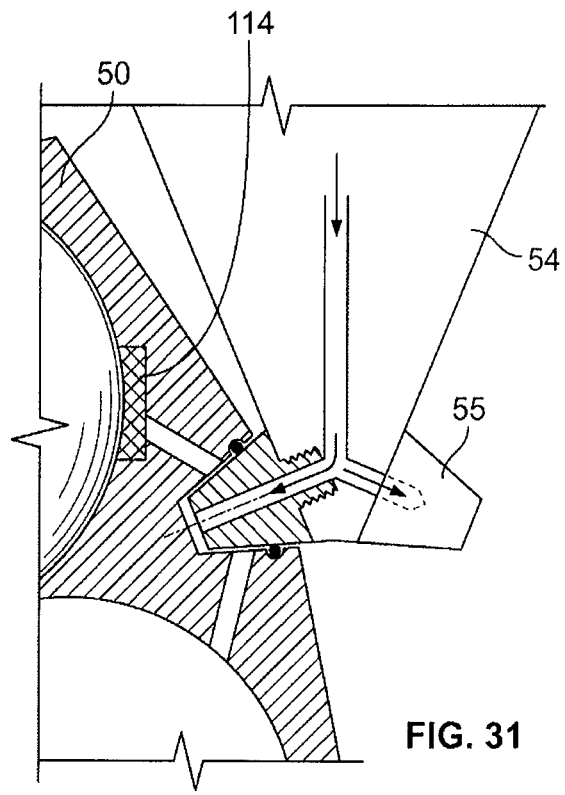
Figure 32:
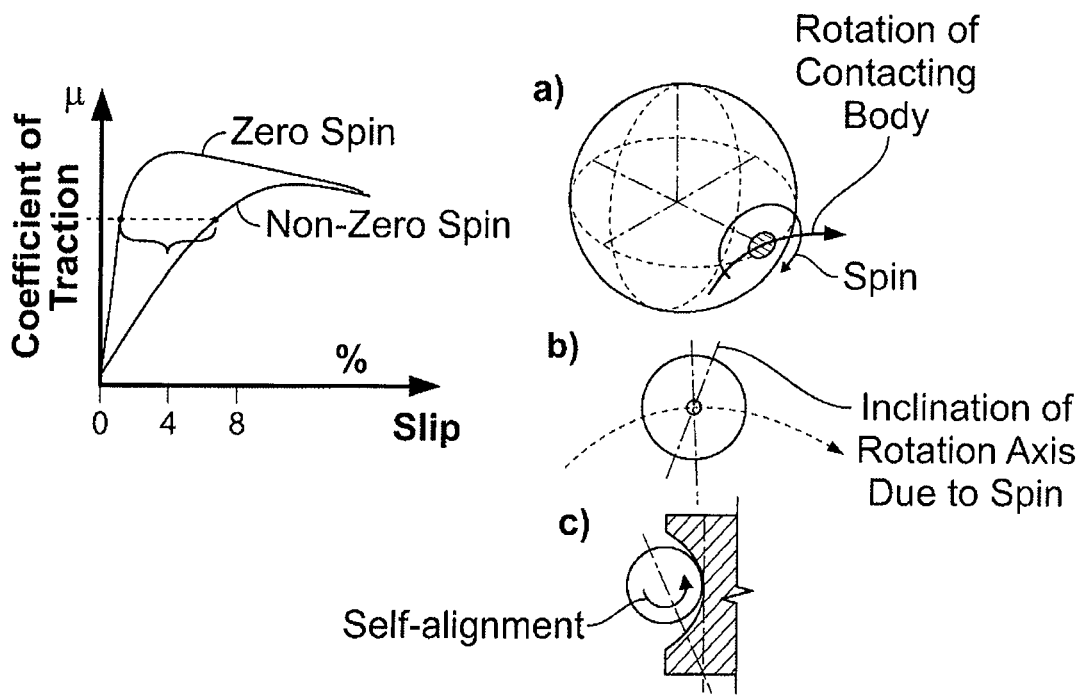
Figure 39:
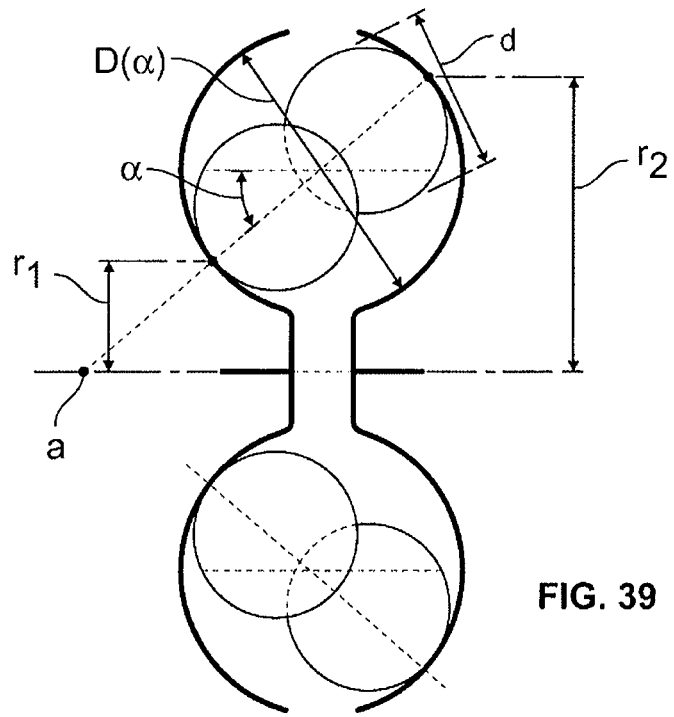
Figure 40:
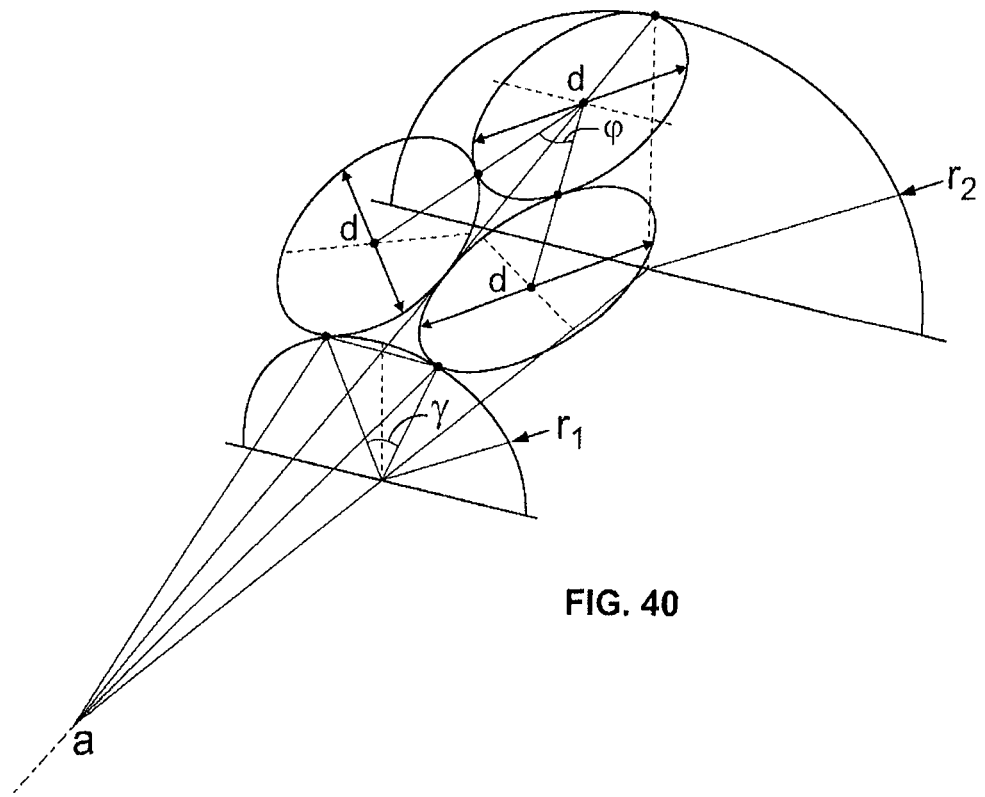
Figure 41:
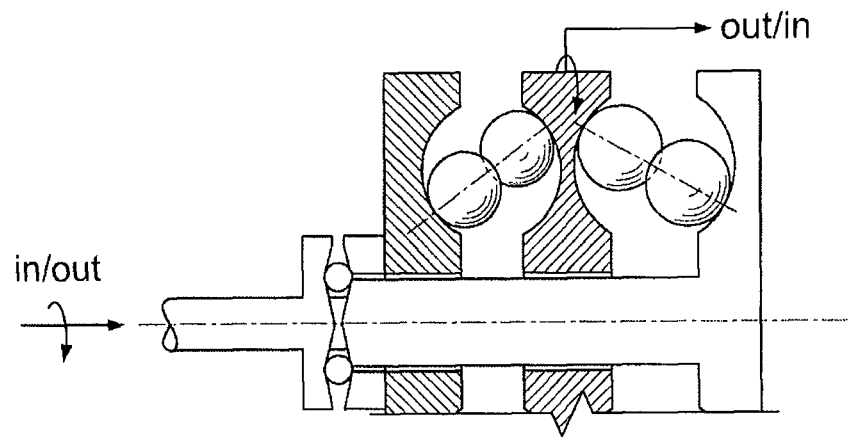
Figure 42:
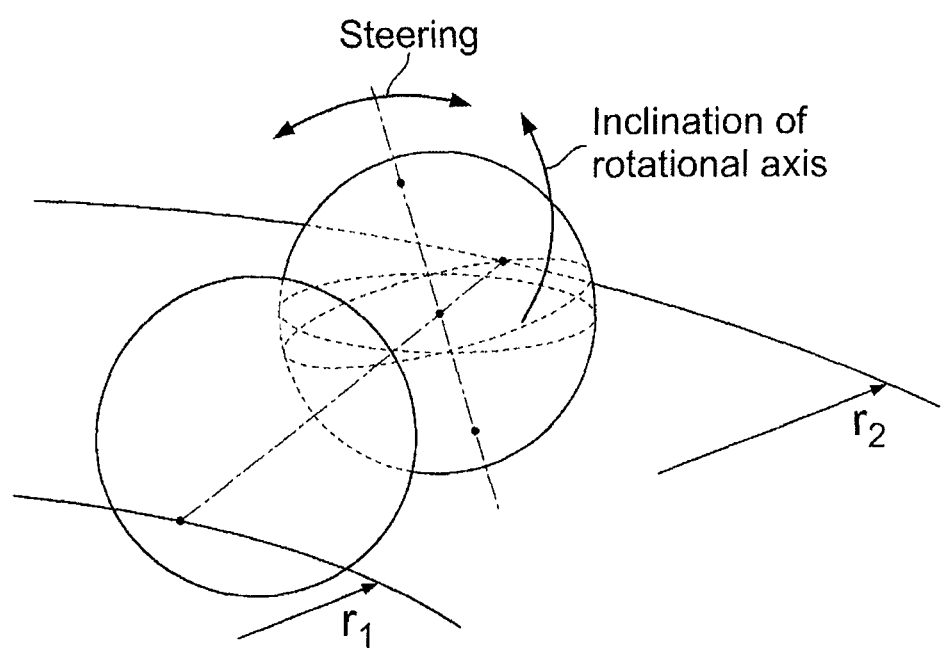

FIG. 19 illustrates a single toroidal cavity arrangement with rotatable balls cages;

FIG. 20 illustrates a crown member with pivots for holding the cages;

FIG. 21 is an enlarged view of the cage and ball system more clearly illustrating a lubrication system;

FIG. 22 is a schematic cross section of a ball cage where its rotation inside the toroidal cavity causes self-alignment of balls' rotational axes via self-steering of balls and consequently changes the ratio of transmission;

FIG. 23 illustrates an individual cage with helical gear teeth;

FIG. 24 is a schematic illustration of the embodiment of FIG. 10 as positioned within a control gear with helical teeth in meshing contact with teeth of the cage;

FIG. 25 illustrates another view of the above cage-control gear arrangement indicating an effect of rotation of the cage caused by rotation of the control gear;

FIG. 26 is a partially cut away view of the preferred embodiment of a transmission employing spherical rollers (balls) and cage system of the present invention;

FIG. 27 is a partial side view of FIG. 26;

FIG. 28 is a schematic illustration of an alternate embodiment of the lubrication system with the rotating housing;

FIG. 29 is a schematic illustration of the dynamic lubrication pick-up "Pitot" tube system used for the lubrication system of FIG. 28;

FIG. 30 is an enlarged view of the lubrication tube system as it is positioned in relation to the crown;

FIG. 31 is an enlarged view of the cage, crown, filter cartridge and lubrication system;

FIG. 32 illustrates the effect of spin on reduction of the available traction coefficient of a common traction fluid;

FIG. 33 illustrates a half of the full symmetrical toroidal cavity with spherical rollers in mutual contact with each other and input and output disks;

FIG. 34 is a view of the arrangement of spherical rollers and forces along line I-I of FIG. 1;

FIG. 35 is a plan schematic view of the row configuration of rollers and input and output disks in intermeshed contact configuration;

FIG. 36 is a schematic illustration of the continuously variable transmission in overdrive configuration;

FIG. 37 is a schematic representation of the continuously variable transmission in 1-to-1 ratio;

FIG. 38 is a schematic illustration of the continuously variable transmission in a reducer or under drive configuration;

FIG. 39 is a schematic illustration illustrating the geometrical configuration of a toroidal cavity;

FIG. 40 is a schematic illustration detailing contact geometry between rotating bodies (orbits of contact points) and denotes geometrical parameters for further illustrations;

FIG. 41 is a schematic illustration of a conventional ball-ramp clamping mechanism for a dual cavity toroidal configuration of continuously variable transmission; and FIG. 42 is a schematic illustration depicting the effect of steering of at least one roller in order to change alignment of the whole group or "train" of rollers.

Similar numerals denote similar elements.

INDUSTRIAL APPLICABILITY

The present invention has applicability in the variable transmission art.

BEST MODE FOR CARRYING OUT THE INVENTION

For purposes of background information, general matters will initially be discussed.

Referring initially to FIG. 1, shown is a full toroidal transmission known in the art, generally denoted by numeral 10, the arrangement includes a pair of rollers 12 and 14 which are angularly repositionable. The rollers 12 and 14 provide a variable relationship between the input shaft 16 and output shaft 18. The shaft is connected to the toroidal cavity 20 created by discs 22 and 24.

In essence, the distance between opposite rollers of the cavity is about the same, save for some deformation of the rollers. Typically, the axle load has to be applied to create the normal force of the roller contacts. The rollers may have traction fluid which circulates inside mainly for enhanced traction and cooling purposes. The contact point between the roller and the transmission of this type is generally elliptical in shape. Typically there will be between 2% and 4% of slippage or varied difference in speed between the roller and the disc at the contact point. This necessitates the need for fraction force and in essence, transfer of power.

Figure 2:
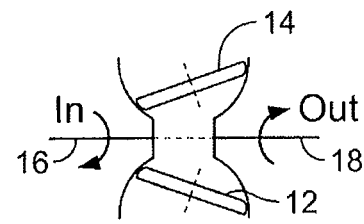
FIG. 2 is a similar view to FIG. 1, illustrating a half-toroidal continuously variable transmission.

FIG. 2 schematically illustrates the "half toroidal" version of transmission of FIG. 1. In this case, both the axle load and the radial load are created on the roller which, in turn, ensures clamping. Losses incurred from friction on bearings supporting radial load diminish the efficiency.

Figure 3:
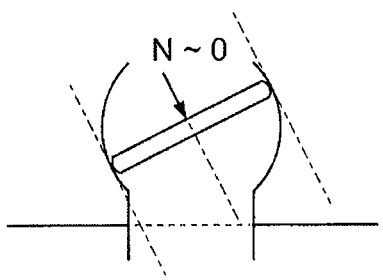
FIG. 3 is a graphical representation illustrating the case of high spin in a full toroidal continuously variable transmission with advantage or relatively low axial force on roller resulted form spin effect and tangential creep.

FIG. 3 is a graphical representation illustrating the cause for spin effect in a full toroidal continuously variable transmission (CVT). Roller clamping occurs between the discs. The axis of rotation of the roller is mainly parallel to the lines which are tangent to the contact points. With rolling, the line of contact and line connecting the axis of rotation should intersect at one point, if zero spin is desired. As is known, a spin is similar to a rotation of that contact point where the friction coefficient or traction coefficient is reduced significantly.

Figure 4:
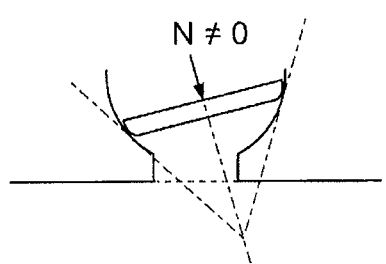
FIG. 4 is a view similar to FIG. 3 showing a low spin advantage of a half-toroidal continuously variable transmission with disadvantage of high axial load on roller resulted form clamping force.
Figure 5:
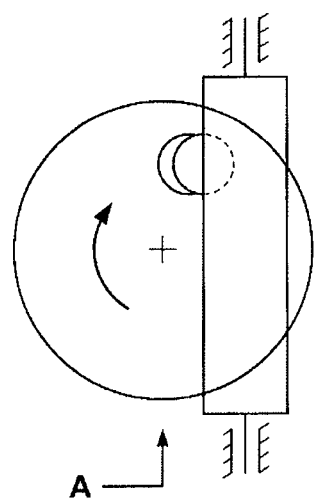
FIG. 5 is a schematic illustration of the basis configuration of the prior art most relevant to present invention and describing two-balls configuration of power transfer.
Figure 6:
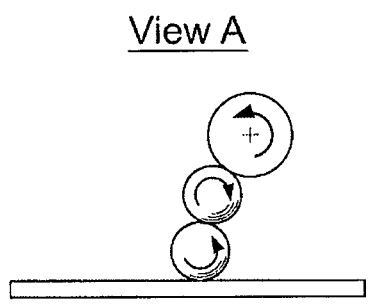
FIG. 6 is an enlarged schematic illustration of two balls aligned in a configuration for transmitting power and referred to in the first embodiment (view 5)

FIG. 4 illustrates the half toroidal CVT, which provides an improved result in terms of spin, since a condition can exist where all three axes and contact points tangent lines will intersect, correspondingly, in one point which will lie in close proximity to the rotational axis of the input and the output shafts.

Referring now to FIG. 7, shown is a basic and simplest configuration of the transmission of the present invention. The overall arrangement is denoted by numeral 30. The arrangement provides an input torque disc 32 and output torque disc 34 and two balls 36, 38 positioned between discs 32 and 34. This arrangement allows the three points of contact between the balls 36 and 38 and the surfaces of the torque discs 32 and 34. As shown, all three axes 40, 42 and 44 and, accordingly, contact points tangential lines 42', 44' and 40' can intersect. This results in a zero spin situation thus maximizing efficiency.

With reference to FIG. 19, shown is a partially cut away view of the one embodiment of the present invention. In this embodiment, balls 36, 38 are positioned in rotatable cages 50 and symmetrically aligned.

FIGS. 19 and 20 illustrate schematically a series of radially oriented balls in individual cages 50 which are held in place by a crown structure denoted by numeral 54. Only one cage 50 is shown in FIG. 20.

With reference to FIG. 21, shown is an enlarged schematic view of the cage 50. The cages 50 include channels 56 to facilitate transportation of lubricant to the balls 36, 38. The cages 50, since they are separable for replacement/repair of the balls 36, 38, include seals 58. The cages 50 include recesses 53 to receive projections 55 associated with crown 54.

FIG. 22 illustrates that rotation of cage 50 around pivoting projections 55 in toroidal cavity causes speed variation and self-alignment of the balls rotational axes minimizing spin.

FIG. 23 illustrates a variation of the cage 50, where the same includes teeth 60 disposed at an angle of approximately 45 degrees about the circumference of the cage 50.

In FIGS. 24 and 25, schematically illustrated is a speed variation control system having a control ring or control gear 62 with teeth 64 cut at approximately a 45 degree angle. Engaged in the teeth 60 of the cage 50 while orientating the control gear 62 facilitates synchronous orientation of all cages 50 and thus alignment and change of speed in a simple way.

Turning now to FIG. 26, shown is yet another embodiment is the invention. In this embodiment, the overall arrangement is represented by numeral 70. The arrangement includes a rotatable housing 74, input or output shaft 78, output or input shaft 82, mounting flange 86, outer toroidal discs 90 and 94 and inner toroidal disc 98. Cages 50 are retained by the crown 54.

The following table tabulates performance data for various sizes of the transmission structure shown in FIG. 26.

| PERFORMANCE TABLE | | | | |
|---|---|---|---|---|
| Values for Ratio 5:1 (2.236 divided by 0.447) | | | | |
| Case #: | D, mm | L, mm | Max Torque, N * m | Max Power, W @ RPM | Max Hertzian Stress, GPa |
| 1 | 9 | 7 | $3.2 \cdot 10^{-3}$ | 6.68 W @ 20,000 | 1.83 |
| 2 | 355 | 280 | 798 | 502 KW @ 6,000 | 2.7 |
| 3 | 887 | 700 | 17,959 | 3.38 MW @ 1,500 | 3.23 |

A particular convenience is that the housing 74 may be protected by a casing which can be meshed to ensure air cooling and safety. Alternatively, the external casing can be solid or part of the equipment in which the CVT is incorporated.

The lubrication can include circulating fluid, air, air-mist, etc. and can employ any convenient method ensuring both purity of traction fluid and cooling. It should be understood though that the traction contact can be either wet or dry or dry-lubricated.

Use of ceramic materials for rolling elements can significantly improve performance and reduce the need for lubrication. For a low speed CVT, bicycle, for instance, much higher Hertzian stresses can be allowed with satisfactory reliability thus improving power density of the device even further.

In a further embodiment, transmission 70 can be linked with planetary or other differential speed gear set (not shown) to provide an infinitely variable transmission or be combined with an electric motor (not shown) or other rotating machinery or instrumentation, etc.

Turning to FIG. 28, traction or lubrication fluid 100 circumferentially disposed will, even at an apparently low speed, cause the liquid 100 to rotate. At higher velocity, the rotating ring of liquid or oil will provide for an effective lubrication system, not unlike a "Pitot" tube used to pick up dynamic pressure of air. With reference to FIG. 29, if a tube 104 were inserted inside of the rotating ring of liquid 106, the result will feed sufficiently high pressure to supply oil to the middle of the device. Further, centrifugal pressure will also be additive thus ensuring sufficient fluid flow for lubrication.

Referring to FIG. 30, shown schematically is one possibility for how the tubes 104 are connected to supply lubrication duct and how the protrusions 55 holding the cages 50 may provide lubrication for the balls. It is envisioned that a replaceable filter cartridge 114 could be included in the system as shown in FIG. 31.

The geometry of the toroidal cavity can be machined in such way that the deformations causes by torque and clamping forces will be resembling of desired shape. In addition, electro-mechanical or hydraulic means can be deployed to assist in reducing deflection of toroidal cavity walls, namely inserts made out of piezo-electric materials, piston-cylinder clamping devices, etc. These methods will also reduce non-linear clamping force vs. traction force behavior of two-roller assembly acting similar to wedge clamping devices.

For improved support of rollers or balls, air bearings can also be used as well as dynamically lubricated journals or socket-ball supports. Compressed air circulation can also assist in cooling where external compressions circuit can be used to remove the heat and the internal expander which will add to the cooling capacity. Alternatively, the same principle applied in a reverse manner can provide an efficient preheating system for cold temperatures.

Although the principle of self-alignment to reduce spin is desirable for some applications controlled positioning of rotational axes of rollers or balls can be easily implemented. It is important to note that one of the balls has a groove (race), its freedom to align is reduced.

Advantageously, the preferred embodiment of the present invention can be scaled down to have balls with diameters as small as 0.2 mm providing for nano-scale devices.

In addition to the details provided herein, the transmission as set forth in claim 1, characterized in that each roller pair is retained within retaining means which may comprise a cage within which each pair of rollers is releasably retained and freely moveable therein. The cage is disengageable to allow removal and repositioning of rollers therein and provide a symmetrical clamping force. Control means for controlling rotation of the cage are also provided. As an example, the control means comprises a control ring with teeth intermeshed with the cage.

Conveniently, the rollers are moveable within a toroidal cavity, which may be a dual cavity or comprise multiple cavities including cavities spaced radially, etc.

As a further feature, the additional gear means for the increase or reduction of rotational speed said gear means include planetary gears and the input member is connected to a sun gear and the output member is connected to a carrier where a ring gear becomes an output of a continuously variable transmission. Optionally, the input member is connected to a sun gear and the output gear is connected to ring gear where a carrier becomes an output of a continuously variable transmission.

In respect of the said retaining means, the same may include channel means for channeling lubricant into contact with the rollers. The lubricant is self-cleaning by centrifugal force which provides for heavy residue and contaminant particles to be drawn to the periphery of the rotating lubrication circuit.

The transmission may also include cage retaining means for retaining the cages in a consolidated grouping. The cages include recesses adapted for receiving pivot points on the cage retaining means. The recesses and pivots include openings for transmitting lubricant.

The cage includes gear teeth and the transmission includes a toothed drive gear for cooperation with the gear teeth of the cage and synchronous tilting of all roller pairs for change of ratio.

Referring now to FIGS. 33 through 42, illustrated are embodiments of the roller arrangements to highlight the fact that the arrangement is sealable.

In the Figures, angle γ defines a maximum number of rollers or balls which can be positioned within the circumference of the minimal radius rl of contacting points between rollers and input or output disks.

The distance between opposite points of balls or rollers arranged in the above mutual contact fashion within a toroidal cavity remains almost unchanged within the broad range of roller alignment angle α and geometrical parameters of the cavity and rollers. The theoretical proof of this phenomenon is left outside of the scope of this description for clarity; however a claim of such relationship is made herein.

The clamping of the rollers is necessary for achieving traction which can be done in any known fashion, such as by a ball-ramp cam clamping system customarily used for variety of continuously variable transmissions. The additional clamping with two rows of rollers is available due to inclined position of the line connecting contact points and additional force, N, arising from this "wedge" type phenomenon. It is important to note that one of the advantages of this system is its ability to transfer torque bi-directionally.

It is also very important to note that the distribution of forces in the two row roller configuration leads to a reduced radial load on the rollers supports, cages or shafts. These forces vary though with the angle a and can even change its direction, but remain much smaller compared to a single row roller transfer system. The explanation of this distribution is left outside of the scope of this description for the purpose of clarity, but a claim to this phenomenon is made herein.

Methods for alignment of the rollers or balls train to achieve a variable ratio can vary from rotatable cages (described in more detail in U.S. Provisional Application No. 61/315,898 "Improvements to Continuously Variable Transmission" by P. Okulov filed with USPTO on Mar. 19, 2010, EFC ID 7250749 the contents of which are incorporated herein by reference), to a system where at least on of the rollers or balls is steerable through either controlled action on it (pushing into a new position, for instance) or via change of the orientation of its rotational axis leading to steering in a new position and consequently change of ratio. As the train of rollers or balls inside a fixed dimensional cavity (toroidal, for instance) or a gap (between plates, for instance) is not free to change part of its geometry apart from the remaining elements belonging to the same "train", the ratio change system can be greatly simplified.

Balls are known in bearing systems as elements which can self align and therefore minimize spin (typically, in a single ball used as a transfer or load bearing systems the spins on the opposite contact points will tend to move the ball into a comfortable, but misaligned position—away from the bearing rotational axis). In a two connected rolling element system though, both rolling bodies have much greater freedom of self alignment for minimizing spin. The disadvantage of ball to ball contact was perceived in the prior art as a factor of reduced bearing capacity, which is entirely true, however, for continuously variable transmission applications even the capacity achieved with ball-to-ball contact can be quite sufficient, or it can be improved even further by providing a groove of a negative radius on one of that mating bodies (as shown in FIG. 9, for instance) or by employing other methods (utilizing ceramic rolling bodies, for instance).

It should be apparent, therefore, that the described arrangement may still be used as a bearing system with fixed contact angle as well as a bearing system with adjustable contact angle and in other systems apart from continuously variable transmissions.

One of the advantages of this system is its enhanced scalability, i.e., it can be scaled down to the size of rolling balls as small as 0.2 mm or scaled up to the size of rollers of hundred millimeters and more. Accordingly, the power transfer ability of such continuously variable transmission can range from mill watts or microwatts to several megawatts where the mechanical design can remain basically the same.

An additional advantage of the present system is its simplicity and use of conventional materials and manufacturing techniques custom for roller bearings and more particularly for conventional ball bearings.

The invention claimed is:

1. A continuously variable transmission having an input member and an output member and a toroidally shaped cavity, characterized in that said transmission comprises a plurality of discrete roller pairs arranged in contact in between said input member and said output member, each roller of said roller pairs in contacting relation with a corresponding roller in a pair and substantially aligned in its rotational axis in a plane substantially perpendicular to a plane of rotation of said input member and said output member, each pair of said rollers of said roller pairs together having rotational or tilting freedom in said perpendicular plane for change of ratio wherein at least one of said rollers has a groove having a negative curvature relative to the curvature of a contacting surface of its corresponding roller.

2. The transmission as set forth in claim 1, characterized in that said rollers have a substantially spherical geometry.

3. The transmission as set forth in claim 1, characterized in that said groove is positioned outside of the equatorial rotational line of said roller.

4. The transmission as set forth in claim 1, characterized in that lines tangential to the contact points of said disks and said rollers and their rotational axes are substantially convergent to a point of intersection.

5. The transmission as set forth in claim 1 characterized that it has additional gear means assisting power transfer between input and output and/or between rollers.

6. The transmission as set forth in claim 4, characterized in that the contact point of a drive roller and input disk is behind the contact point of a driven roller and output disk in the direction of rotation of disks.

7. A method of increasing the output efficiency of a continuously variable transmission, characterized in that the method comprises the steps of:
   providing an input member having a rotational axis;
   providing an output member having a rotational axis;
   providing a plurality of discrete roller pairs arranged in contact in between said input member and said output member, each roller of said roller pairs in contacting relation with a corresponding roller and aligning in its rotational axis in the plane perpendicular to a plane of rotation of said input member and said output member, each pair of said rollers of said roller pairs together having rotational or tilting freedom in said plane;
   providing at least one of said rollers in said roller pairs with a groove having a negative curvature relative to the curvature of a contacting surface of its corresponding roller;
   positioning said discrete roller pairs such that the rotational axis of each roller in said roller pairs intersect as close as possible at a point with said rotational axis of said input member and said output member, whereby spin between rollers in said roller pairs is substantially eliminated to provide maximized output.

8. The method as set forth in claim 7, characterized in that said rollers curvatures at contacting points are chosen to provide approximately the same bearing capacity of all contacting points between rollers in a pair and rollers and said input and output members.

9. The method as set forth in claim 7, characterized in that a roller in said roller pair is a driven roller and the counterpart roller in said roller pair is the drive roller, said rollers arranged in wedged configuration to provide clamping force necessary for traction.

10. A continuously variable transmission containing an input member and an output member and a toroidally shaped cavity, said transmission comprises:
 a plurality of discrete roller pairs arranged in contact in between said input member and said output member, each roller of said roller pairs in contacting relation with a corresponding roller in a pair and self-aligning in its rotational axis in a plane perpendicular to a plane of rotation of said input member and said output member each pair of said rollers of said roller pairs together has tilting freedom in said plane wherein at least one of said rollers has a groove having a negative curvature relative to the curvature of a contacting surface of its corresponding roller;
 retaining means for retaining discrete roller pairs; and
 lubrication means for introducing lubricant to said roller pairs.

11. The transmission as set forth in claim 10, characterized in that said retaining means comprise a cage, said cage being movable for repositioning of rollers relative to the input and output members.

12. The transmission as set forth in claim 10, characterized in that said lubrication means comprises a source of lubricant circumferentially and rotatably retained by centrifugal force about said roller pairs and transportable to said roller pairs during rotation of said pairs through dynamic pressure between the lubricant and a lubricant pick-up inserted in said source of rotating lubricant.

13. A continuously variable transmission containing an input member and an output member forming a toroidally shaped cavity, said transmission comprises:
 a plurality of discrete roller pairs arranged in contact in between said input member and said output member, each roller of said roller pairs in contacting relation with a corresponding roller in a pair and self-aligning in its rotational axis in a plane perpendicular to a plane of rotation of said input member and said output member, each pair of said rollers of said roller pairs together has rotational freedom in said plane wherein at least one of said rollers has a groove having a negative curvature relative to the curvature of a contacting surface of its corresponding roller;
 retaining means for retaining discrete roller pairs;
 lubrication means for introducing lubricant into said roller pairs; and
 a housing surrounding said roller pairs and said toroidal cavity.

14. A continuously variable transmission per claim 13, characterized in that said housing is pressurized to allow lubrication and/or cooling or preheating of said transmission by compressed gas circuit.

15. A continuously variable transmission containing an input member and an output member forming a toroidally shaped cavity, said transmission comprises:
 a plurality of discrete roller pairs arranged in contact in between said input member and said output member, each roller of said roller pairs in contacting relation with a corresponding roller in its pair and with a roller in an adjacent pair, each roller being capable of aligning its rotational axis in a plane perpendicular to the plane of rotation of said input member and said output member, each pair of said rollers of said linked roller pairs together has rotational or tilting freedom in said plane for change of ratio wherein at least one of said rollers has a groove having a negative curvature relative to the curvature of a contacting surface of its corresponding roller, and
 retaining means for retaining and tilting of at least one roller pair.

* * * * *